(12) United States Patent
Nagano

(10) Patent No.: US 9,395,550 B2
(45) Date of Patent: Jul. 19, 2016

(54) LASER LIGHT SOURCE

(71) Applicant: Sumitomo Electric Industries, Ltd., Osaka-shi (JP)

(72) Inventor: Shigehiro Nagano, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 24 days.

(21) Appl. No.: 14/418,344

(22) PCT Filed: Aug. 28, 2013

(86) PCT No.: PCT/JP2013/073049
§ 371 (c)(1),
(2) Date: Jan. 29, 2015

(87) PCT Pub. No.: WO2014/034738
PCT Pub. Date: Mar. 6, 2014

(65) Prior Publication Data
US 2015/0185492 A1 Jul. 2, 2015

(30) Foreign Application Priority Data
Aug. 30, 2012 (JP) .................................. 2012-190170

(51) Int. Cl.
| G02B 27/30 | (2006.01) |
| H01S 3/10 | (2006.01) |
| G02B 19/00 | (2006.01) |
| G02B 27/00 | (2006.01) |
| H01S 3/00 | (2006.01) |
| B23K 26/06 | (2014.01) |
| H01S 3/067 | (2006.01) |

(52) U.S. Cl.
CPC ............ *G02B 27/30* (2013.01); *B23K 26/0648* (2013.01); *B23K 26/0665* (2013.01); *G02B 19/0014* (2013.01); *G02B 19/0047* (2013.01); *G02B 27/0025* (2013.01); *H01S 3/005* (2013.01); *H01S 3/067* (2013.01)

(58) Field of Classification Search
USPC ................................................ 359/641; 372/9
See application file for complete search history.

(56) References Cited

FOREIGN PATENT DOCUMENTS

| JP | 09-105877 A | 4/1997 |
| JP | 2001-102663 A | 4/2001 |
| JP | 2005-313195 A | 11/2005 |
| WO | WO-2013/031524 A1 | 3/2013 |

OTHER PUBLICATIONS

International Search Report issued in PCT Application No. PCT/JP2013/073049 dated Dec. 3, 2013.
Notification of Transmittal of Translation of the International Preliminary Report on Patentability issued in PCT Application No. PCT/JP2013/073049 dated Mar. 12, 2015.

*Primary Examiner* — Jack Dinh
(74) *Attorney, Agent, or Firm* — Venable LLP; Michael A. Sartori

(57) ABSTRACT

The present invention relates to a laser light source which reduces wavelength-dependent difference of focal position of condensed light when multicolor light with a wide spectral width is collimated and then condensed. The laser light source incorporates a collimator device, in which an installation position of a collimating lens with respect to a laser light entrance portion is set so that a beam waist position of laser light having passed through the collimating lens shifts closer to the collimating lens with a shorter-wavelength-side wavelength component out of wavelength components included in the laser light.

7 Claims, 14 Drawing Sheets

LASER LIGHT SOURCE

TECHNICAL FIELD

The present invention relates to a laser light source incorporating a collimator device for collimating input light with a wide spectral width, and configured to collimate and then condense the input light with the wide spectral width, thereby realizing laser irradiation.

BACKGROUND ART

Processing using laser light is carried out by use of a configuration wherein laser light divergently emitted from an end face of an optical fiber is collimated and thereafter the collimated laser light is condensed by using a condensing lens, to focus the laser light at a point on a workpiece. When the laser light is multicolor light with a wide spectral width such as white light, the focal length differs depending upon the wavelengths of the light. Due to it, a position (beam waist) where the light emitted from the end face of the optical fiber becomes a plane wave after collimated, with respect to the end face of the optical fiber also differs depending upon the wavelengths of the light, and thus it is difficult to focus wavefronts of the multicolor light at one point. Therefore, the conventional laser processing technology is designed to use an achromatic lens as the condensing lens, thereby to reduce chromatic aberration.

SUMMARY OF INVENTION

Technical Problem

The Inventor conducted research on the conventional laser processing technology and found the problem as described below. Namely, when the multicolor light is light with the spectral width of several hundred nm, it is expected that, even with the use of the achromatic lens, there arises considerable difference in position of focal point due to the difference of wavelength components. In thin-film microfabrication for which accuracy of depth is required, the chromatic aberration can affect the processing accuracy.

Specifically, in an example of light with the spectral width from 0.9 µm to 1.55 µm, the difference of focal positions of wavelength components is as large as 156 µm with use of a plano-convex lens whereas it is improved to 60 µm with the use of the achromatic lens. However, influence is enormous with a thin workpiece having the film thickness of less than 60 µm.

The present invention has been accomplished in order to solve the problem as describe above, and it is an object of the present invention to provide a laser light source which incorporates a collimator device which, when collimating multicolor light with a wide spectral width, is capable of more reducing the wavelength-dependent position difference of the beam waist where a plane wave is generated (variation in beam waist position dependent on wavelengths included in the multicolor light), the laser light source being capable of effectively reducing the chromatic aberration (focal length difference depending upon the wavelengths in the multicolor light) in condensing the multicolor light, thereby achieving a remarkable improvement in processing accuracy in the depth direction.

Solution to Problem

In order to achieve the above object, a laser light source according to a first aspect of the present invention comprises a single-mode optical fiber, a collimating lens, a condensing lens, a laser light entrance portion, and a collimating lens installation portion. The single-mode optical fiber emits laser light with a spectral width of several hundred nm from a core portion thereof. The collimating lens collimates the laser light divergently emitted from the single-mode optical fiber. The condensing lens condenses the laser light collimated by the collimating lens. The laser light entrance portion sets an entrance position of the laser light emitted from the single-mode optical fiber. The collimating lens installation portion fixes the collimating lens.

Particularly, in the laser light source according to the first aspect, an installation position of the collimating lens with respect to the laser light entrance portion is set so that a beam waist position of the laser light having passed through the collimating lens shifts closer to the collimating lens with a shorter-wavelength-side wavelength component out of wavelength components included in the laser light.

As a second aspect applicable to the foregoing first aspect, the laser light may include a wavelength component the beam waist position of which is located on the single-mode optical fiber side with respect to the collimating lens. Furthermore, as a third aspect applicable to at least either one of the first and second aspects, the collimating lens has a light entrance face for the laser light emitted from the single-mode optical fiber to enter and a light exit face for the laser light to exit. In this third aspect, when, with respect to a position of the light exit face of the collimating lens arranged so that a focal point of the collimating lens is located on a light exit end face of the single-mode optical fiber at a center wavelength of the laser light, a negative region is defined on the single-mode optical fiber side and a positive region on the condensing lens side, the collimating lens is installed preferably in the range of +100 µm to +1000 µm along the optical axis of the laser light emitted from the single-mode optical fiber.

The Inventor confirmed that in at least any one of the first to third aspects as described above, the chromatic aberration was suppressed when the installation position of the collimating lens was set in the range where the beam waist position on the shorter wavelength side shifted closer to the collimating lens than the beam waist position on the longer wavelength side. A specific installation position suitable for the collimating lens is from +100 µm to +1000 µm from a position $f_{1.31\mu m}$ (the focal length of the collimating lens for a reference wavelength component at the center wavelength 1.31 µm) apart from the entrance position of the laser light and preferably from near +125 µm to +1000 µm (on the condensing lens side with respect to the position $f_{1.31\mu m}$ apart from the entrance position of the laser light). The term "center position of the collimating lens" means a position defining an effective maximum diameter of the lens, as shown in FIGS. 6A to 6C and FIG. 9A, and in the description hereinbelow, "position of the collimating lens" simply stated without any particular note shall mean the "center position of the collimating lens." Similarly, "center position of the condensing lens" means a position defining an effective diameter of the lens, as shown in FIG. 9A, and in the description hereinbelow, "position of the condensing lens" simply stated without any particular note shall mean the "center position of the condensing lens."

As a fourth aspect applicable to at least any one of the foregoing first to third aspects, the laser light source may comprise a condensing lens installation portion which fixes the condensing lens. In this case, an installation position of the condensing lens with respect to the collimating lens is set so as to fall within a region where the beam diameter of the laser light having passed through the collimating lens is not more than an effective aperture diameter of the condensing lens and within a region where chromatic aberration (wavelength-dependent focal length difference) of the laser light condensed through the condensing lens becomes minimum. This configuration makes it feasible to perform highly accurate control in the depth direction. Where the condensing lens should be installed is determined based on the conditions that the beam diameter of the laser light is not more than the effective aperture diameter of the condensing lens and that a tolerance becomes larger with a gentler slope of a graph indicating a relation of distance to chromatic aberration (wavelength-dependent focal length difference), while the distance between the center position of the collimating lens and the center position of the condensing lens is adjusted so that the chromatic aberration of the laser light condensed through the condensing lens reaches zero. As an example, the installation position of the collimating lens with respect to the laser light entrance portion is $f_{1.31\mu m}$+125 µm and the installation position of the condensing lens with respect to the collimating lens, i.e., the distance between the center position of the collimating lens and the center position of the condensing lens is 600 mm. However, what size is tolerated is also important in terms of downsizing of the laser light source itself Therefore, the installation position of the collimating lens and the installation position of the condensing lens will be different depending upon whether importance is placed on the tolerance or on downsizing of a laser head. A reflecting mirror may be arranged in the optical path between the collimating lens and the condensing lens.

As a fifth aspect applicable to at least any one of the foregoing first to fourth aspects, the collimating lens is preferably a lens that reduces chromatic aberration. As a sixth aspect applicable to at least any one of the foregoing first to fifth aspects, the condensing lens is preferably a lens that reduces chromatic aberration. An example of the lens that reduces chromatic aberration is an achromatic lens.

As a seventh aspect applicable to at least any one of the foregoing first to sixth aspects, the laser light source may comprise a position adjustment portion provided for either one of the laser light entrance portion and the collimating lens installation portion. This position adjustment portion enables position adjustment of the distance between the entrance position of the laser light and the center position of the collimating lens in a 10-µm or smaller level.

Advantageous Effect of Invention

The present embodiment provides the laser light source incorporating the collimator device which, when collimating the multicolor light with the wide spectral width, is capable of more reducing the wavelength-dependent difference of the position (beam waist) where the plane wave is generated, the laser light source being capable of reducing the wavelength-dependent focal position difference, in collimating and then condensing the input light with the wide spectral width.

DESCRIPTION OF EMBODIMENTS

Each embodiment of the present invention will be described below in detail with reference to the accompanying drawings. In the description of the drawings the same portions and the same elements will be denoted by the same reference signs, without redundant description.

Figure 1A:
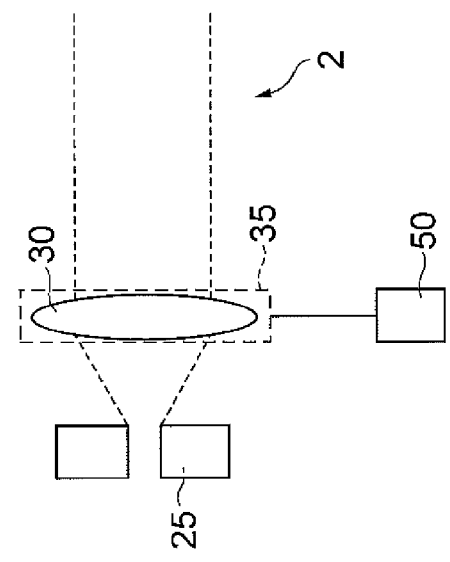
FIGS. 1A and 1B are schematic configuration diagrams of a collimator device and a laser light source incorporating the same according to the present embodiment.
Figure 1B:
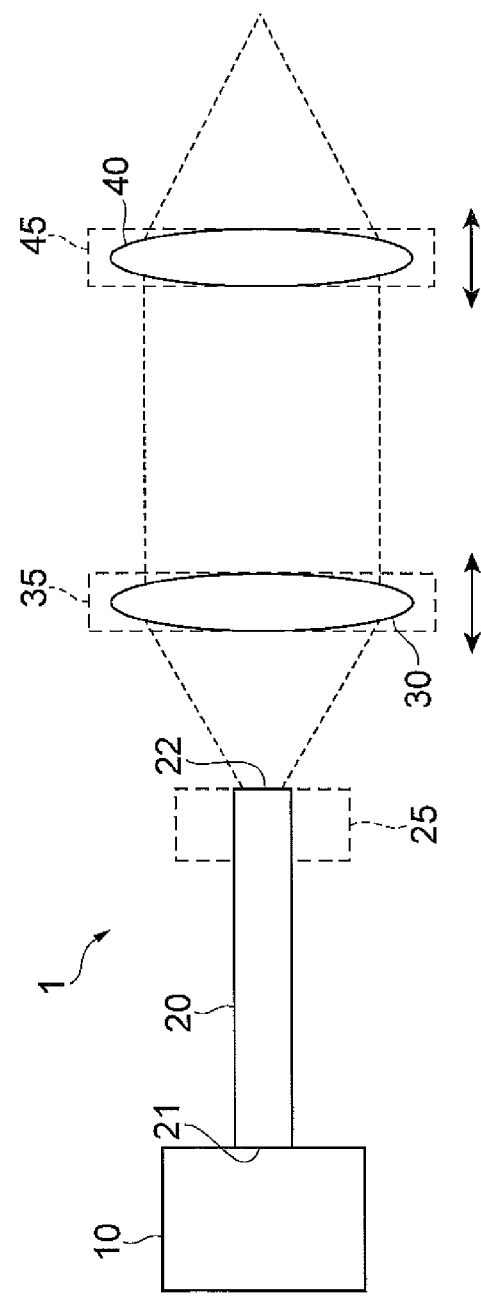

FIGS. 1A and 1B are schematic configuration diagrams of a collimator device 2 and a laser light source 1 of the first embodiment incorporating it. The collimator device 2 in FIG. 1A is composed of a laser light entrance portion 25 which sets an exit position of laser light, a collimating lens 30, a collimating lens installation portion 35 which fixes the collimating lens 30, and a position adjustment portion 50 which adjusts the position of the laser light entrance portion, in order to adjust the distance between the laser light exit position (optical fiber exit end face) 22 of the laser light entrance portion 25 and the position of the collimating lens 30. The position adjustment portion 50 may be installed so as to be able to adjust the position of the collimating lens installation portion 35. The laser light source 1 in FIG. 1B is configured including a light source 10, an optical fiber (delivery fiber) 20, the laser light entrance portion 25 fixing the end face 22, the collimating lens 30, the collimating lens installation portion 35 fixing the collimating lens 30, a condensing lens 40, and a condensing lens installation portion 45 which fixes the condensing lens 40. Among these, the laser light entrance portion 25, collimating lens 30, and collimating lens installation portion 35 function as the collimator device. The laser light source 10 may include the optical fiber 20 for output. The exit end face 22 of the optical fiber 20 may be one having an end cap structure of a coreless fiber to reduce the power density of light having been guided through the optical fiber 20, in order to avoid damage to the end face of the optical fiber 20, at its end.

The multicolor light source 10 is a light source which emits multicolor light with the spectral width from 0.9 to 1.55 μm, as an example. The multicolor light emitted from the multicolor light source 10 enters a core region of the optical fiber 20 at one end face 21 of the optical fiber 20. The optical fiber 20 is composed of the core region in a central portion and a cladding region covering the periphery of the core region, and the multicolor light entering the core region through the end face 21, propagates in the core region to be output from the other exit end face 22. The diameter of the core region of the optical fiber 20 is, for example, about 10 μm. If the laser light with high output power is emitted from the narrow core region, the exit end face 22 of the optical fiber 20 could be subjected to damage of end face; therefore, the laser light is output through the end cap fiber comprised of a careless fiber or the like capable of reducing the power density for avoiding the damage. As an example, the end cap fiber is a coreless glass rod with the length of 500 μm and the diameter of 125 μm. In practice, the exit diameter and exit angle are assumed with these elements being installed and the laser light source 1 is designed in accord with them. For simplifying the description, the below will describe the configuration without installation of the end cap on the exit end face 22 of the optical fiber 20.

The multicolor light emitted from the exit end face 22 of the optical fiber 20 is incident into the collimating lens 30 to be collimated, and then the collimated light is emitted therefrom. Thereafter, the collimated multicolor light is incident into the condensing lens 40 and, through the condensing lens 40, the light is condensed at different points P for respective wavelengths (point Pmin (nearest focal position) to point Pmax (farthest focal position)).

The exit end face 22 of the optical fiber 20 is fixed by the laser light entrance portion 25. The collimating lens 30 is fixed by the collimating lens installation portion 35. The relative positions of the collimating lens installation portion 35 and the laser light entrance portion 25 can be adjusted in units of μm by the position adjustment portion 50. The condensing lens 40 is fixed by the condensing lens installation portion 45. The relative positions of the condensing lens 45 and the collimating lens installation portion 35 can be adjusted in units of 10 mm.

In general, if the light emitted from the multicolor light source 10 is light of a single wavelength, or monochromatic light, it is feasible to generate parallel light from the light emitted from the optical fiber 20, by disposing the collimating lens 30 at the position of the focal length f corresponding to the wavelength thereof. Then, a plane wave can be generated at a desired position by adjusting the position of this collimating lens 30. Furthermore, by locating the condensing lens 40 at the position where the plane wave is generated, a focal point where the monochromatic light is most condensed is formed at the position of the focal length from the condensing lens 40.

Figure 2A:
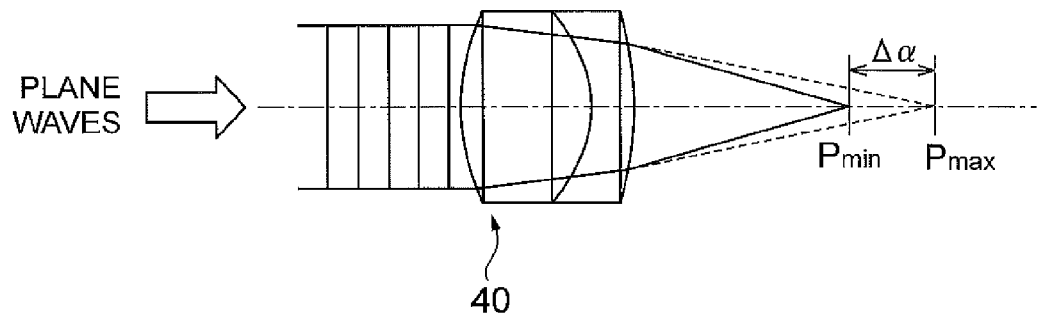
FIGS. 2A and 2B are drawings showing chromatic aberration (wavelength-dependent focal length difference) in cases where plane waves are made incident to each of a plano-convex lens and an achromatic lens.
Figure 2B:
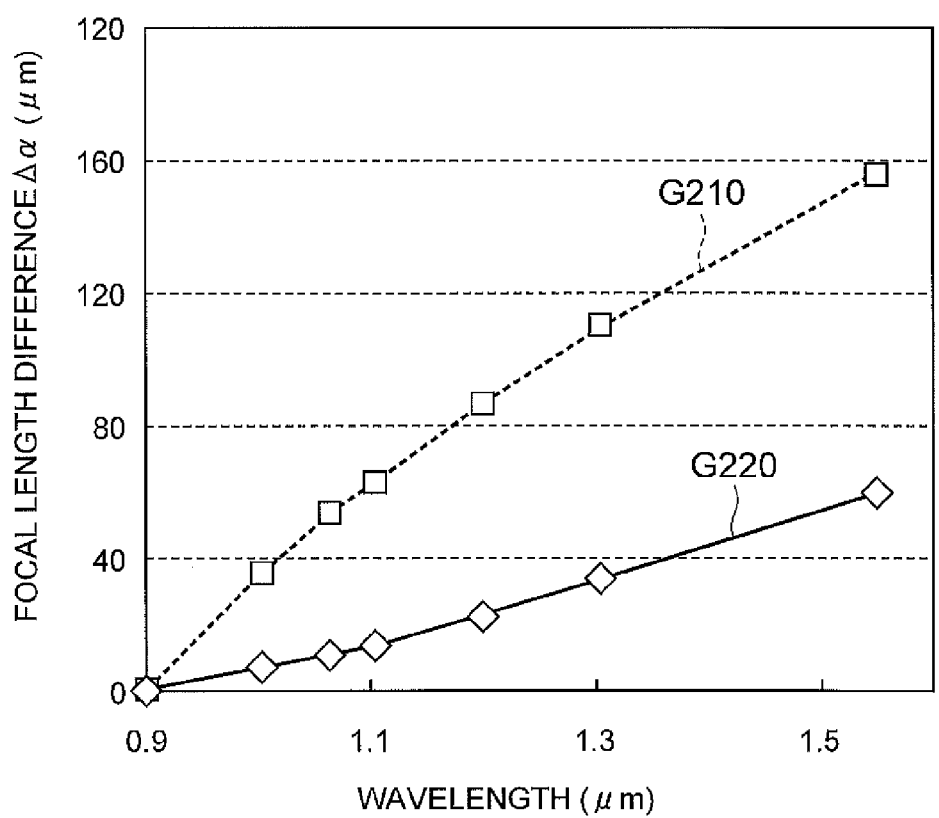

It was considered that when the light emitted from the multicolor light source 10 was multicolor light with the wavelength region as wide as several hundred nm, even if plane waves were generated at the same position by the collimating lens 30, the condensing lens 40 would fail to condense multicolor beams at one point in the optical-axis direction because of chromatic aberration of the beams. Now, let us show in FIGS. 2A and 2B the results of calculation of chromatic aberration with incidence of ideal plane waves into each of a plano-convex lens and an achromatic lens (model number: AC050-008-C, manufactured by Thorlab Inc.). FIG. 2A is a drawing showing a focal length difference $\Delta\alpha$ due to the chromatic aberration of multicolor light with incidence of the plane waves and FIG. 2B shows the results thereof. In FIG. 2B, graph G210 indicates the calculation result with the plano-convex lens and graph G220 the calculation result with the achromatic lens. The vertical axis in the graphs of FIG. 2B represents differences of focal positions of beams of respective wavelengths where 0 is defined at a position of focus of light of the 0.9-μm wavelength band after passage through the condensing lens (the plano-convex lens or the achromatic lens). For example, it is shown that the achromatic lens used in the calculation in FIG. 2B can exercise the function as achromatic lens for multicolor light from 0.7 μm to 1.1 μm. On the other hand, it was confirmed by the result of calculation that the achromatic lens demonstrated lens characteristics (change of focal position) for light of wavelengths of 1.2 μm and 1.3 μm almost comparable to those for the multicolor light from 0.7 μm to 1.1 μm.

The difference of focal position between light of the wavelength of 0.9 μm and light of the wavelength of 1.3 μm is about 40 μm with use of the achromatic lens and about 120 μm with use of the plano-convex lens. Namely, it is confirmed that the difference of focal position can be made much smaller with various wavelengths of incident light by use of the achromatic lens as condensing lens than by use of the plano-convex lens.

In the case where the multicolor light emitted from the exit end face 22 of the optical fiber 20 as delivery fiber is collimated by the collimating lens 30 and condensed by the condensing lens 40 as in the laser light source 1 in FIG. 1B, the incident light into the condensing lens 40 was generally required heretofore to be the plane waves, as shown in FIGS. 2A and 2B. However, the divergent light travels through the collimating lens 30, so that incident wavefronts into the condensing lens 40 are different for the respective wavelengths due to refractive-index dispersion of the collimating lens 30, which makes focal positions complicated.

Figure 3:
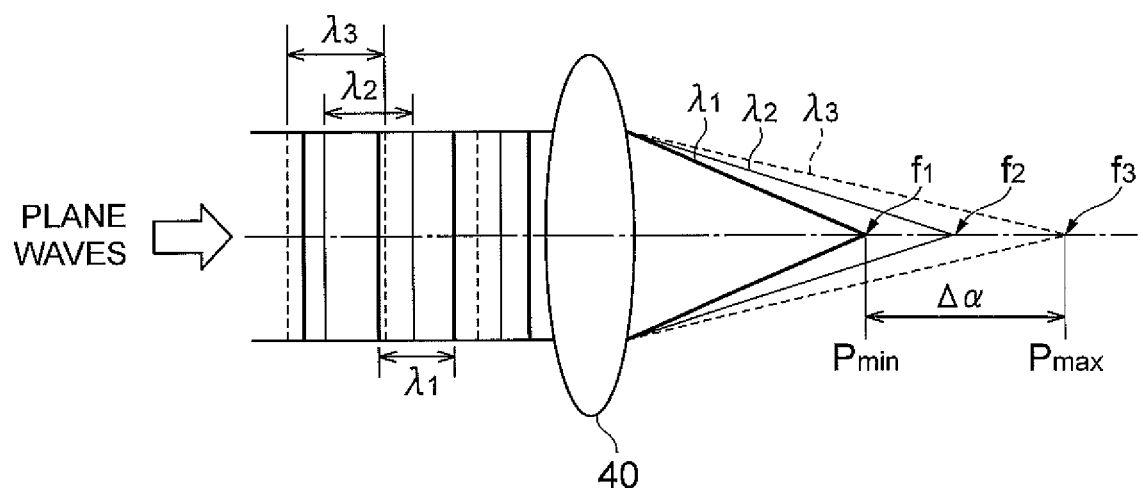
FIG. 3 is a schematic view for explaining change in focal position with incidence of plane waves of multiple wavelength components into a condensing lens ($\lambda_1 < \lambda_2 < \lambda_3$).

Then, let us first describe a mechanism for suppressing the chromatic aberration (wavelength-dependent focal length difference) by the present embodiment in detail with reference to FIG. 3. FIG. 3 is a schematic view for explaining change in focal position with incidence of plane waves of multiple wavelength components into the condensing lens ($\lambda_1 < \lambda_2 < \lambda_3$).

As shown in FIG. 3, when light of plane waves including wavelength components $\lambda_1$, $\lambda_2$, and $\lambda_3$ is incident into the condensing lens 40, the incident light is focused at positions of focal lengths f. When the wavelengths of the plane waves satisfy the relation of $\lambda_1 < \lambda_2 < \lambda_3$, the wavelength components condensed through the condensing lens 40 are focused at different positions, $f_1$, $f_2$, and $f_3$, respectively, according to the refractive-index dispersion of its material. Namely, the focal length of the wavelength component $\lambda_1$ focused through the condensing lens 40 is $f_1$, the focal length of the wavelength component $\lambda_2$ focused through the condensing lens 40 is $f_2$, and the focal length of the wavelength component $\lambda_3$ focused through the condensing lens 40 is $f_3$. For example, the difference $\Delta\alpha$ between the position $P_{min}$ of $f_1$ and the position $P_m$ of $f_3$ (wavelength-dependent focal length difference) is generally called chromatic aberration. Since a material demonstrates the refractive-index dispersion, the chromatic aberration always arises with intervention of a lens or the like. In the present specification, the foregoing difference $\Delta\alpha$ will be referred to simply as focal length difference.

Figure 4A:
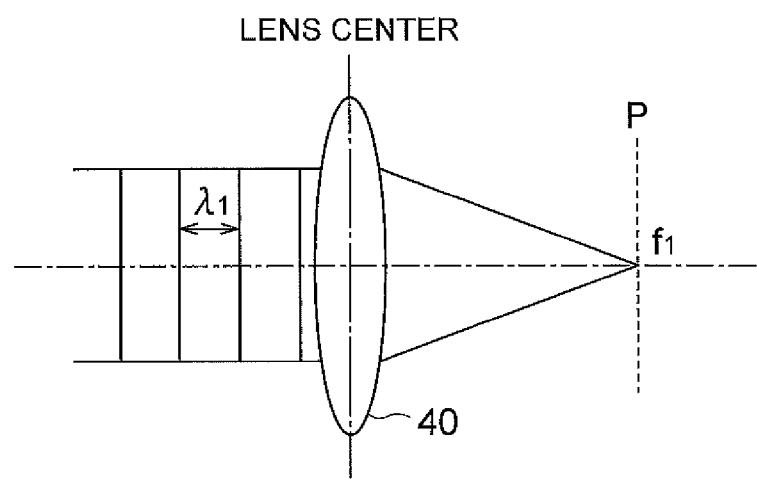
FIGS. 4A to 4C are drawings for explaining relations of focal lengths to incident wavefronts.
Figure 4B:
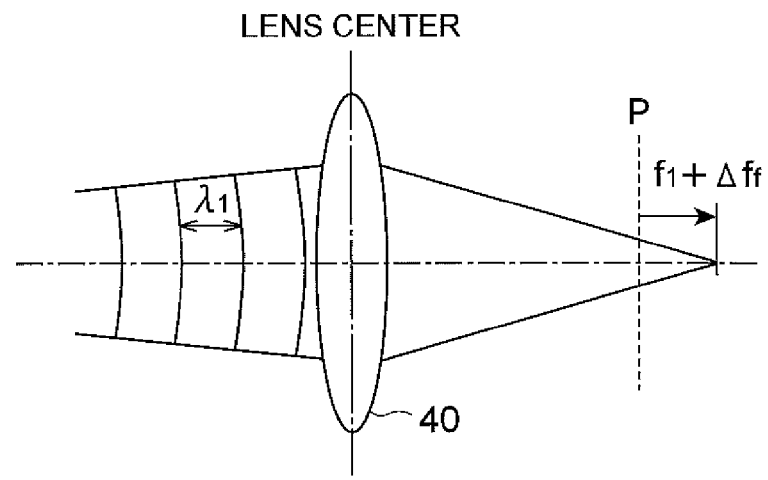
Figure 4C:
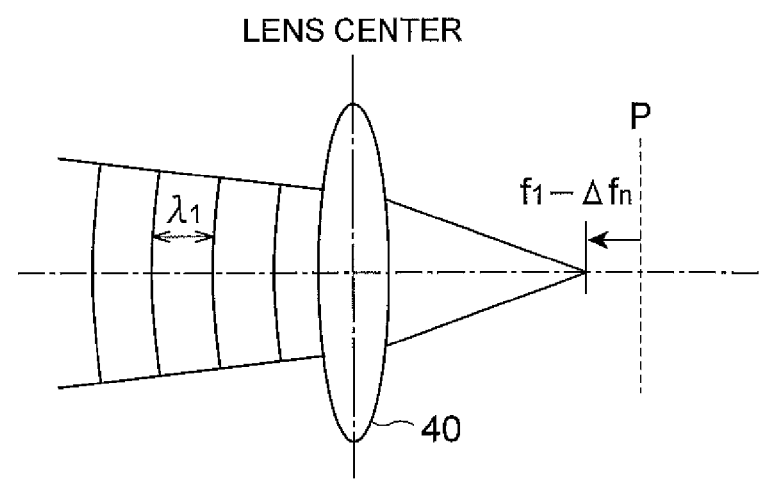
Figure 5A:
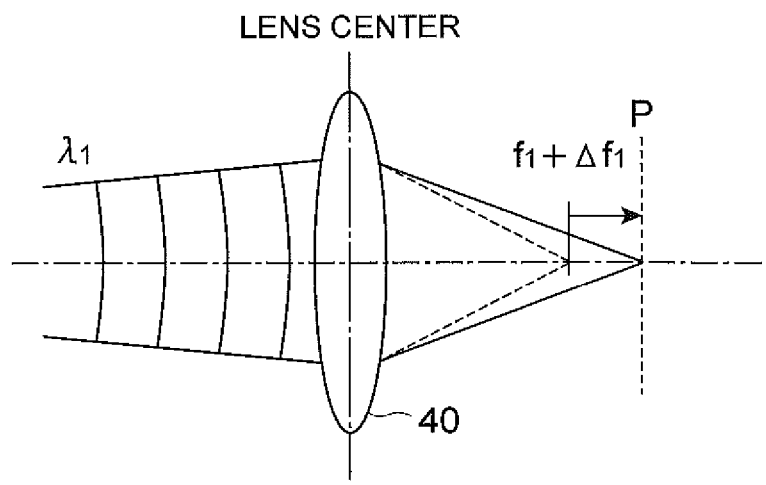
FIGS. 5A to 5C are drawings for explaining the concept of the present embodiment to suppress chromatic aberration by controlling incident wavefronts for respective wavelength components.
Figure 5B:
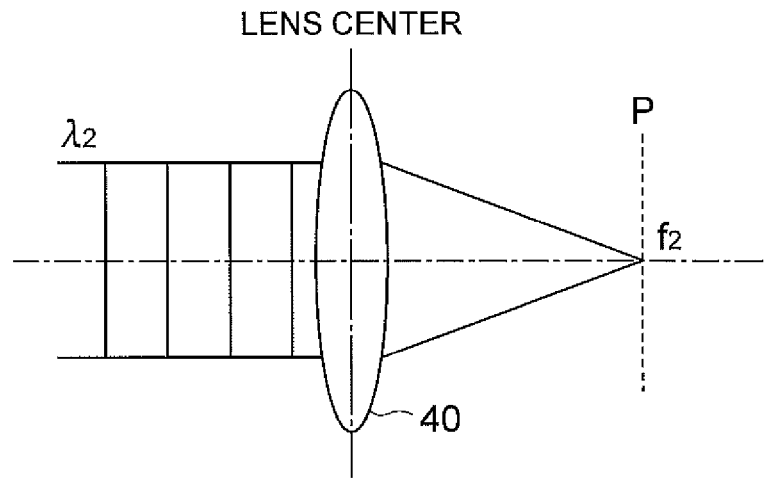
Figure 5C:
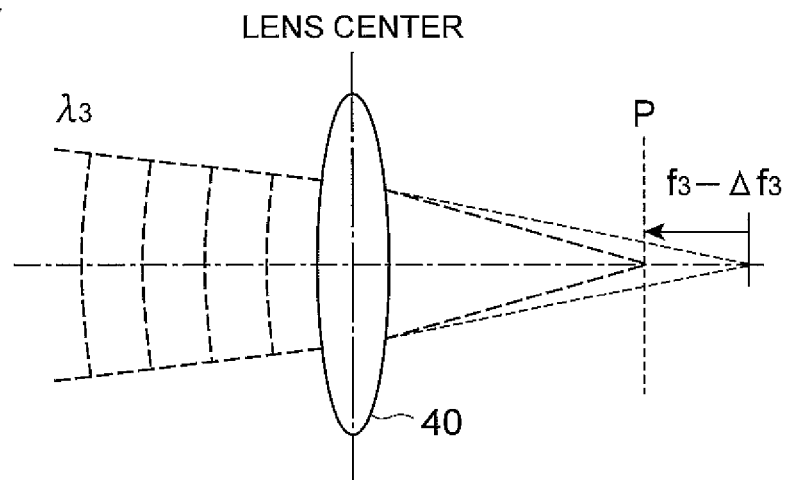

The following will describe control of focal lengths of wavelength components condensed by the condensing lens 40, using FIGS. 4A to 4C and FIGS. 5A to 5C. FIGS. 4A to 4C are drawings for explaining relations of focal lengths to incident wavefronts, wherein FIG. 4A shows a relation of the focal length to a plane wave of the wavelength $\lambda_1$, FIG. 4B a relation of the focal length to a wavefront of the wavelength $\lambda_1$ with a negative radius of curvature (a wavefront convex toward the right in the drawing), and FIG. 4C a relation of the focal length to a wavefront of the wavelength $\lambda_1$ with a positive radius of curvature (a wavefront convex toward the left in the drawing). FIGS. 5A to 5C are drawings for explaining the concept of the present embodiment to suppress the chromatic aberration by controlling the incident wavefront for each wavelength component, wherein FIG. 5A shows a relation of the focal length to a wavefront of the wavelength $\lambda_1$ with a negative radius of curvature (a wavefront convex toward the right in the drawing), FIG. 5B a relation of the focal length to a plane wave of the wavelength $\lambda_2$, and FIG. 5C a relation of the focal length to a wavefront of the wavelength $\lambda_3$ with a positive radius of curvature (a wavefront convex toward the left in the drawing). Every condensing lens 40 shown in FIGS. 4 and 5 is an achromatic lens (model number: AC050-008-C) manufactured by Thorlab Inc.

In FIGS. 4A to C, the wavelength is fixed at $\lambda_1$ in each case, and the wavefronts impinging on the condensing lens 40 are three types, the plane wave (A), the wavefront with the negative radius of curvature (B), and the wavefront with the positive radius of curvature (C). The focal length in FIG. 4A is $f_1$, which is the same as in the case of FIG. 3. In the case of FIG. 4B, since the light impinging on the condensing lens 40 has a predetermined divergence angle equal to an angle of incidence θ to a normal to the condensing lens 40 (which is coincident with the optical axis of the condensing lens 40), the focal length is $f_1 + \Delta f_\beta$ according to the Snell's law applied to the entrance surface side and the exit surface side of the lens. On the other hand, the behavior is opposite in the case of FIG. 4C to that in FIG. 4B, and thus the focal length is $f_1 + \Delta f_n$. This means that the focal length is controlled by controlling the wavefront impinging on the condensing lens 40.

FIGS. 5A to 5C show development of the focal length control shown in FIGS. 4A to 4C. In FIGS. 5A to 5C, the wavelengths satisfy the relation of $\lambda_1 < \lambda_2 < \lambda_3$. In the case of FIG. 5B, the focal length at the wavelength $\lambda_2$ of the plane wave is $f_2$ as in FIG. 3. When the wavefront of the wavelength $\lambda_4$ is a plane wave, the focal length is $f_1$; whereas, when the wavefront of the wavelength $\lambda_4$ has the negative radius of curvature as shown in FIG. 5A, the focal length shifts from $f_1$ in the case of the plane wave toward $f_2$. When the incident light has a wavefront with an appropriate negative radius of curvature, $f_1 + \Delta f_1 = f_2$ comes to hold. On the other hand, in the case of FIG. 5C, the wavefront of the wavelength $\lambda_3$ has the positive radius of curvature, and thus the focal length shifts from $f_3$ in the case of the plane wave toward $f_2$. When the incident light has a wavefront with an appropriate positive radius of curvature, $f_3 - \Delta f_3 = f_2$ comes to hold, as in the case of the wavelength X. However, the basic premise herein is that the radii of curvature of the wavefronts on the shorter-wavelength-side component and the longer-wavelength-side component can be controlled to the negative and to the positive, respectively.

When the multicolor light emitted from the optical fiber 20 as delivery fiber is collimated by the collimating lens 30, there arises difference in angle of emergence of each wavelength component, because of wavelength dependence of the mode field diameter (MFD) of the optical fiber 20. In addition, there is fear of influence of the refractive-index dispersion of a wideband spectrum as to the collimating lens 30. Namely, since a beam propagation characteristic of light (laser light) having passed through the collimating lens 30 is dependent on each wavelength, it is difficult, for example, to convert all the wavefronts of the respective wavelengths impinging on the condensing lens 40 to plane waves. Then, the wavefront control by the present embodiment for the light having passed through the collimating lens 30 will be described below in detail using FIGS. 6A to 6D.

Figure 6A:
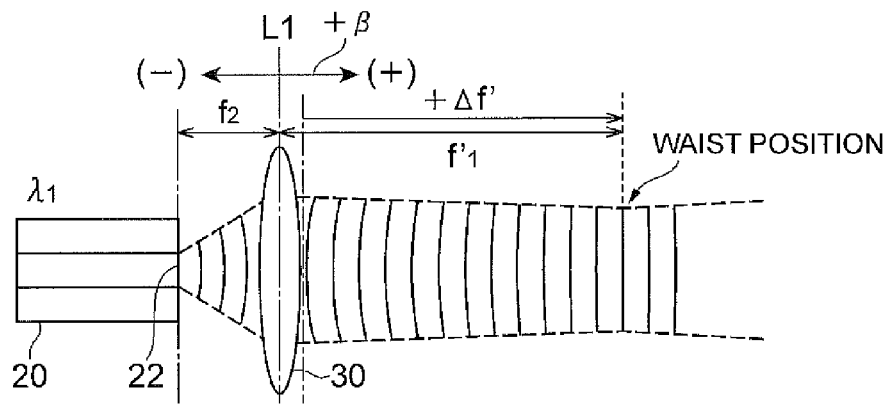
FIGS. 6A to 6D are drawings schematically showing how the beam waist position changes depending upon the wavelength of output light with respect to the distance $f_2$' from the collimating lens to the beam waist (plane wave), in a state in which the distance between the end face of the optical fiber and the center position of the collimating lens is fixed at the focal length at the wavelength X.
Figure 6B:
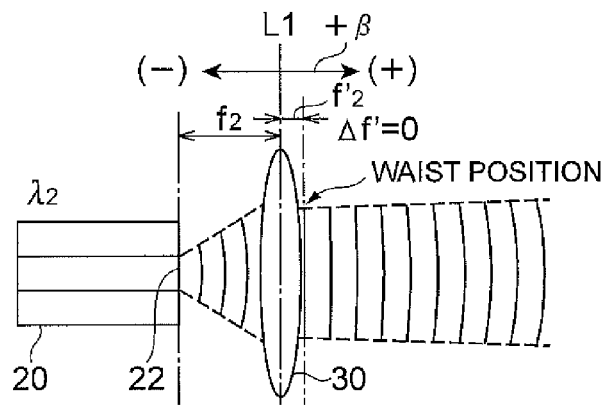
Figure 6C:
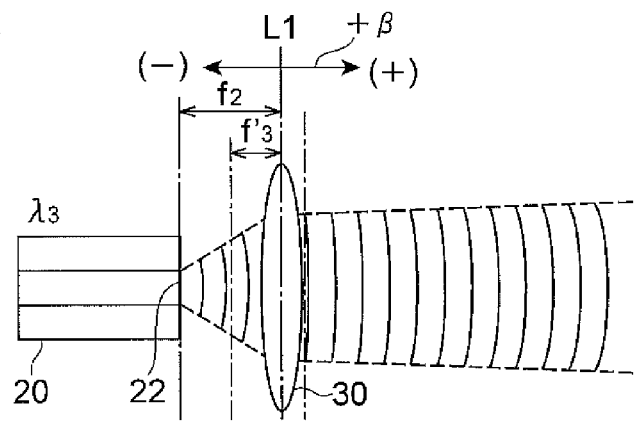
Figure 6D:
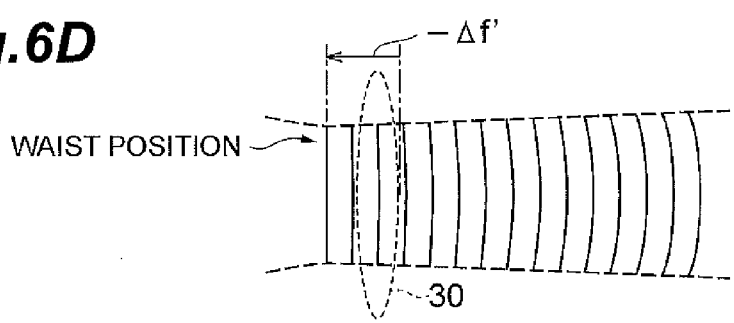

FIGS. 6A to 6D are drawings schematically showing how the beam waist position varies depending upon the wavelength of output light with respect to the distance $f_2'$ from the collimating lens 30 to the beam waist (plane wave), in a state in which the distance between the end face of the optical fiber 20 and the center position of the collimating lens 30 is fixed at the focal length at the wavelength $\lambda_2$. In FIG. 6A to FIG. 6C, the wavelengths are in the relation of $\lambda_1 < \lambda_2 < \lambda_3$. FIG. 6D is a reference drawing showing the beam waist position virtually formed in FIG. 6C.

Specifically, FIG. 6A shows the beam waist position of light of the wavelength $\lambda_4$, where the collimating lens 30 is installed at the distance of $f_2$ (the focal length at the wavelength $\lambda_2$) from the exit end face 22 of the optical fiber 20. In FIG. 6A, the beam waist position (indicated as waist position in the drawing) of the light of the wavelength $\lambda_1$ having passed through the collimating lens 30 is denoted by FIG. 6B shows the beam waist position of the light of the wavelength $\lambda_2$ and in the case of FIG. 6B, since the collimating lens 30 is located at the position of $f_2$ from the light exit end face 22 of the optical fiber 20, the wavefront immediately after passage through the collimating lens 30 is a plane wave (waist position: $f_2'$). FIG. 6C shows the beam waist position of the light of the wavelength $\lambda_3$ and, as in the cases of FIGS. 6A and 6B, the collimating lens 30 is installed at the distance of $f_2$ from the exit end face 22 of the optical fiber 20. There is no waist position in this case of FIG. 6C. Then FIG. 6D shows the virtual beam waist position at the position of $f_3'$ in the case of FIG. 6C. In FIGS. 6A to 6C, the following relations with respect to $f_2'$ hold: $f_1' = f_2' + \Delta f$ and $f_3' = f_2' - \Delta f'$. When a deviation of the center position of the collimating lens 30 from the position $L_1$ of $f_2$ from the exit end face 22 of the optical fiber 20 is defined as an adjustment position 13, the waist position $\Delta f'$ (position variation amount) of another wavelength X relative to the reference wavelength of the wavelength $\lambda_2$ is given by $f_n'(\beta) - f_2'(\beta)$. Positive values of the adjustment position β indicate a region on the condensing lens 40 side with respect to the installation position $L_1$ and negative values of the adjustment position β a region on the exit end face 22 side with respect to the installation position $L_1$.

Figure 7:
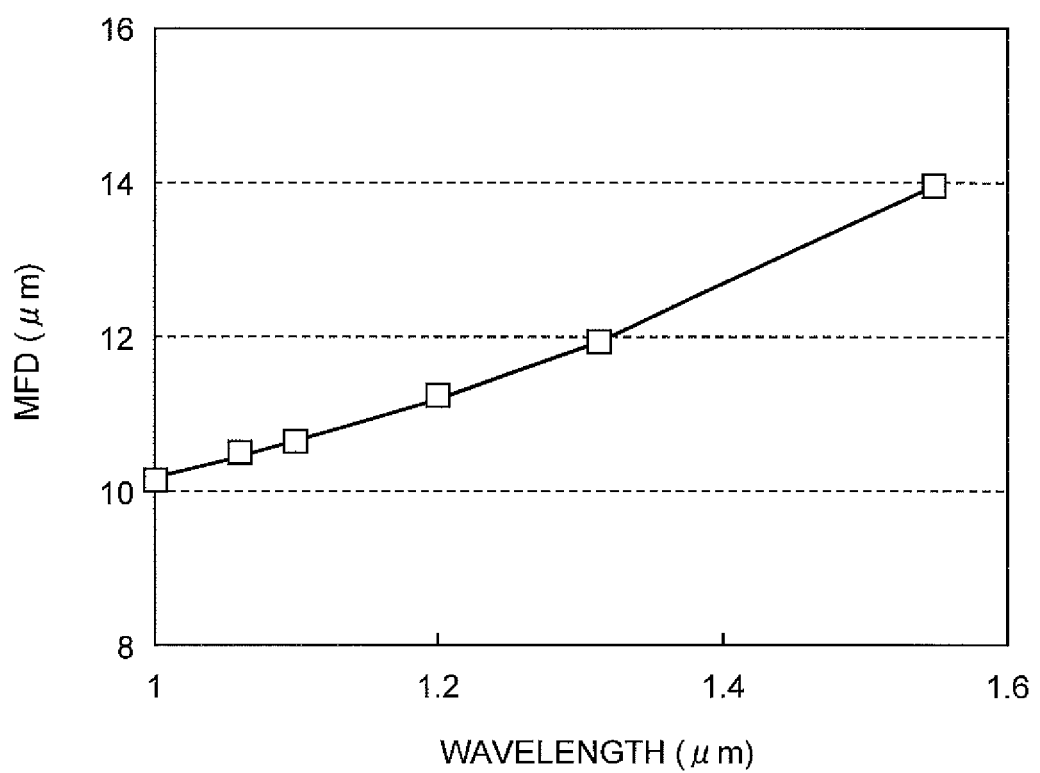
FIG. 7 is a drawing showing a relation of mode field diameter (MFD versus wavelength of the optical fiber in which laser light from a multicolor light source propagates.

FIG. 7 shows a relation of mode field diameter (MFD) versus wavelength of the optical fiber in which the laser light from the multicolor light source propagates. This relation of FIG. 7 is the result of calculation of MFD against the wavelength (1.0 μm to 1.55 μm) with use of the Nufern's large mode area (LMA) fiber. The model number of the LMA fiber is PLMA-YDF-10/125-VIII and the LMA fiber has the core diameter of 11.0 μm and the numerical aperture NA of 0.075.

Figure 8:
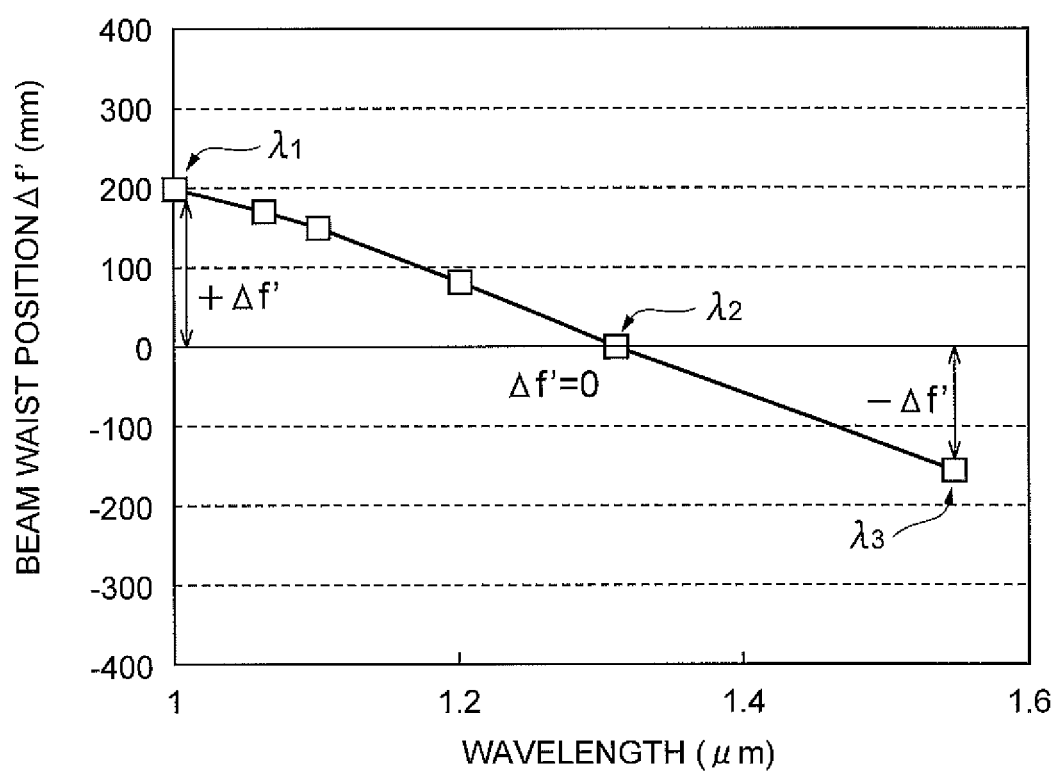
FIG. 8 is a drawing showing a relation of wavelength versus beam waist position Δf'.

FIG. 8 is a drawing showing a relation of wavelength versus beam waist position Δf'. This relation of FIG. 8 is the result of calculation of the waist positions for light of the wavelengths (1.0 μm to 1.55 μm) having passed through the collimating lens 30. FIG. 8 is the calculation result with the use of the foregoing LMA fiber (by making use of the MFDs in FIG. 7 for the calculation). The collimating lens 30 used herein was a communication-band achromatic doublet lens (model number: AC050-008-C) manufactured by Thorlab Inc. ($f_{1.31\mu m}$=5.2407 mm).

Figure 13:
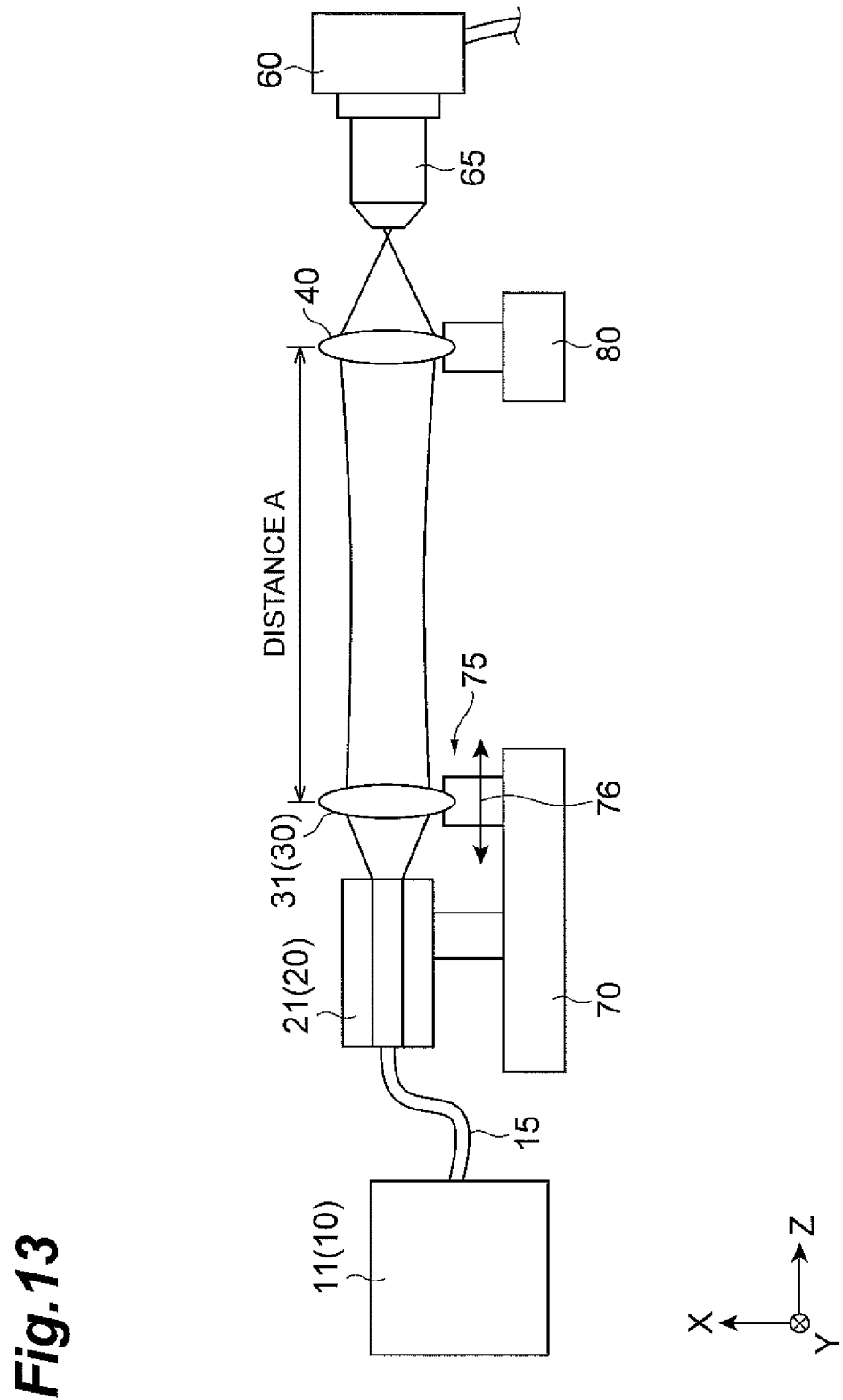
FIG. 13 is a drawing showing a configuration of an inspection optical system of the present embodiment.

Namely, FIG. 7 is the calculation result of MFDs of the LMA fiber for the wavelengths 1.0 μm, 1.06 μm, 1.1 μm, 1.31 μm, and 1.55 μm, and these wavelengths are center wavelengths of band-pass filters (BPF) used in a below-described inspection optical system (FIG. 13). FIG. 8 shows the calculation result of the beam waist positions Δf' obtained by using the calculated values of MFDs shown in FIG. 7 and defining the wavelengths $\lambda_1$, $\lambda_2$, and $\lambda_3$ shown in FIGS. 6A to 6D as 1.0 μm, 1.31 μm, and 1.55 μm, respectively. The collimating lens 30 adopted herein was a communication-band achromatic doublet lens (model number: AC050-008-C) manufactured by Thorlab Inc., which is the same lens as the condensing lens 40 in FIG. 2A. The distance from the exit end face 22 of the optical fiber 20 to the collimating lens 30 is 5.2407 mm in the case of the wavelength 1.31 μm ($f_{1.31\mu m}$=5.2407 min). In FIG. 8, in the case of the wavelength 1.31 μm, Δf=0 because the light immediately after passage through the collimating lens 30 is a plane wave. On the other hand, in the cases of the wavelength 1.0 μm and the wavelength 1.55 μm, values of Δf' of the respective beams are +201.0 mm and −153.8 mm, respectively. As described previously in the descriptions of FIGS. 6A to 6D, Δf' of the light of the wavelength 1.55 μm is the waist position in the virtual space.

Figure 9A:
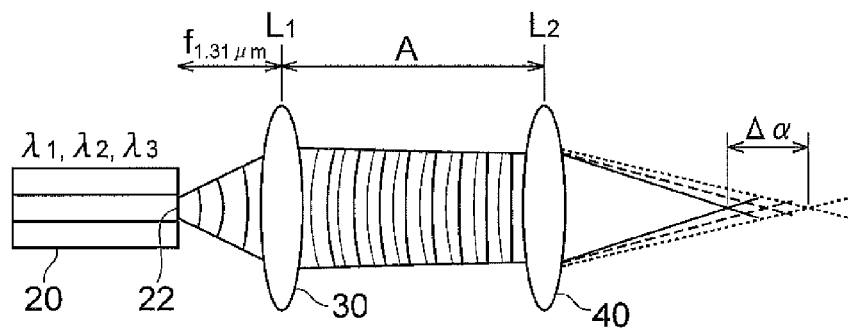
FIGS. 9A and 9B are drawings showing a relation of wavelength-dependent focal length difference Δα versus distance A between the center position of the collimating lens and the center position of the condensing lens, in a state in which the distance between the exit end face of the optical fiber and the center position of the collimating lens is fixed at the focal length of the collimating lens at the wavelength 1.31 µm.
Figure 9B:
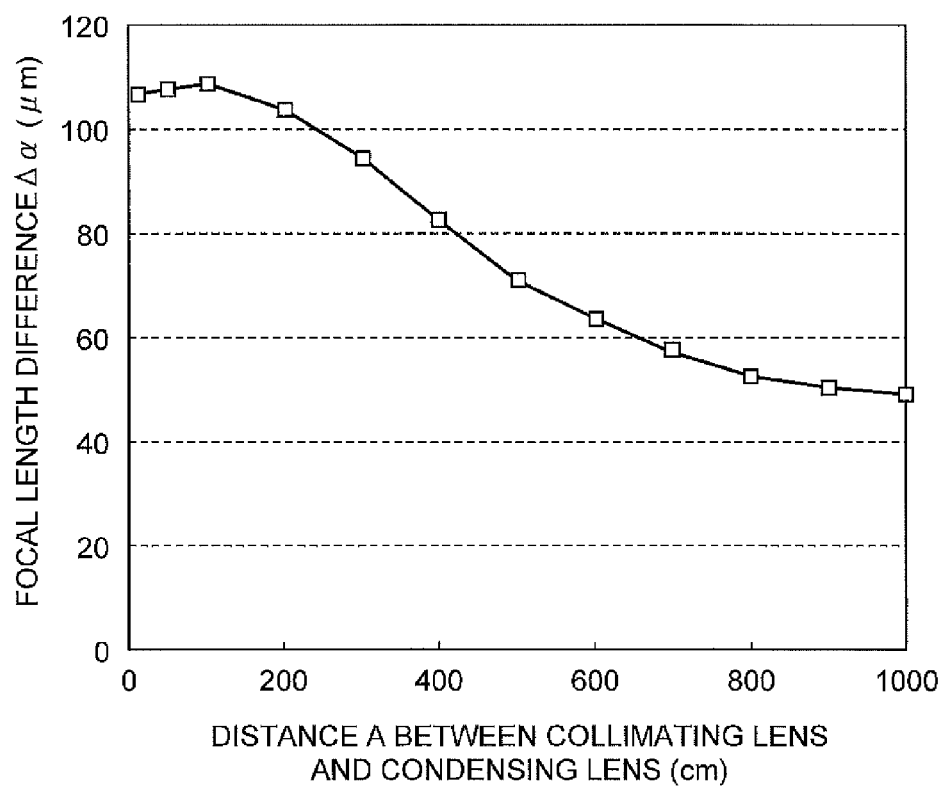

FIGS. 9A and 9B are drawings showing a relation of wavelength-dependent focal length difference Δα versus distance A between the center position of the collimating lens 30 and the center position of the condensing lens 40, in a state in which the distance between the exit end face 22 of the optical fiber 20 and the center position of the collimating lens 30 is fixed at the focal length of the collimating lens 30 at the wavelength 1.31 μm. Specifically, FIG. 9A is a schematic view in the case where the condensing lens 40 is arranged under the condition of FIG. 8, and FIG. 9B shows the result of calculation of the relation of focal length difference Δα of the condensing lens 40 for the light beams of the wavelengths of 1.0 μm to 1.55 μm. In the configuration of FIG. 9A, the LMA fiber was adopted and the collimating lens 30 and condensing lens 40 adopted were communication-band achromatic doublet lenses (model number: AC050-008-C) manufactured by Thorlab Inc. ($f_{1.31\mu m}$=5.2407 mm) The calculation in FIG. 9B was conducted using the MFD values in FIG. 7.

In FIG. 9A, the collimating lens 30 is installed at the position of 5.2407 mm from the exit end face 22 of the optical fiber 20 so as to be located at the focal length $f_{1.31\mu m}$ at the wavelength 1.31 μm. The distance between the collimating lens 30 and the condensing lens 40 was A and the chromatic aberration of focused light (wavelength-dependent focal length difference) was defined as Δα. In this case, as seen from FIG. 9B, Δα takes a maximum of 109 μm around the distance A=100 cm and decreases with increase in the distance A. Δα=50 μm at the distance A=1000 cm. Since $\Delta\alpha_{|1.0-1.55|}$ (cf. FIG. 2A) with plane waves is approximately 50 μm, it is difficult to suppress the chromatic aberration under the conditions of FIGS. 9A and 9B. The simulation condition in the present embodiment is based on the reference at the center wavelength of 1.31 μm in the wavelength range of 1.0 μm to 1.55 μm, but, in terms of suppression of chromatic aberration, we can presume that it leads to expansion of chromatic aberration but the suppression thereof is difficult (cf. FIGS. 5A to 5C). The simulation condition in the present embodiment is that the wavefront condition of FIG. 5A (the wavefront with the negative radius of curvature) is applied to the light of the wavelength $\lambda_3$, the wavefront condition of FIG. 5B (the plane wave) to the light of the wavelength $\lambda_2$, and the wavefront condition of FIG. 5C (the wavefront with the positive radius of curvature) to the light of the wavelength $\lambda_1$ ($\lambda_1 < \lambda < \lambda_3$). Namely, the focal position for the shorter-wavelength-side wavelength ($\lambda_1$) becomes the position ($f_1$−Δ$f_1$) away from $f_2$, from the wavefront condition of FIG. 5C. On the other hand, the focal position for the longer-wavelength-side wavelength ($\lambda_3$) becomes the position ($f_3$+Δ$f_3$) away from $f_2$, from the wavefront condition of FIG. 5A. This indicates that it is difficult to suppress the chromatic aberration, with the steadily-decreasing characteristic of the beam waist position Δf decreasing with increase of wavelength as shown in FIG. 8. From the above, it is preferable for the chromatic aberration suppression that the characteristic of Δf' in FIG. 8 should be a steadily-increasing state increasing with increase of wavelength." However, there are propagation characteristics dependent on the respective wavelengths and wavefront situations vary with the distance A; therefore, it is important to check characteristics at respective distances A.

Figure 10:
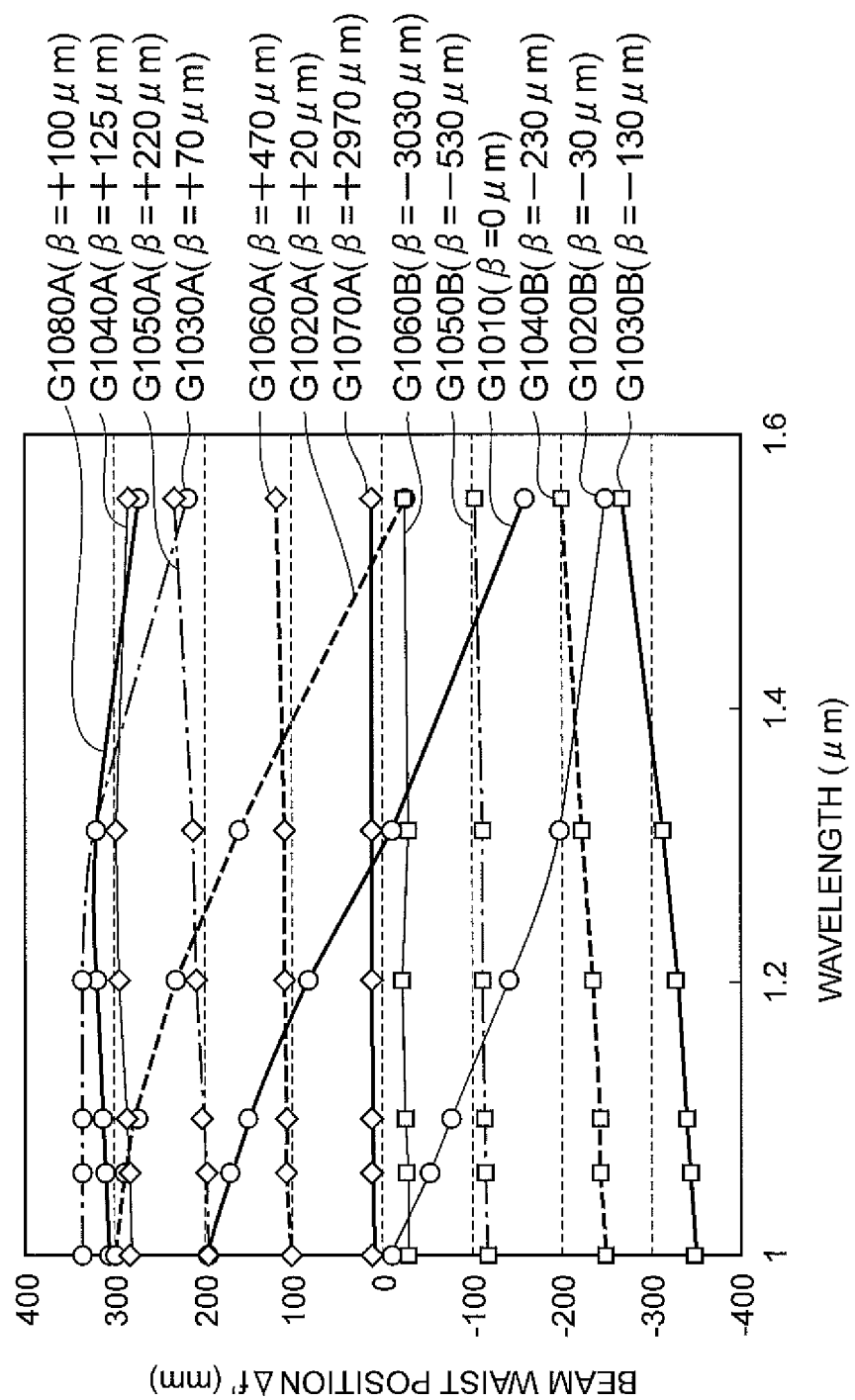
FIG. 10 is a drawing showing the calculation results of beam waist position versus wavelength from 1.0 µm to 1.55 µm, with change in adjustment position β of the collimating lens.

FIG. 10 is a drawing showing the calculation results of beam waist positions for the wavelengths of 1.0 μm to 1.55 μm with change in adjustment position β along the optical-axis directions from the reference position $L_1$ of the collimating lens 30, i.e., the calculation results of beam waist positions Δf for the respective wavelengths with shift of the collimating lens 30 in units of several ten μm in the positive and negative optical-axis directions from the reference position $L_1$. The reference position $L_1$ of the collimating lens 30 is set at the position $f_{1.31\mu m}$ away from the exit end face 22 of the optical fiber 20 (β=0 μm at $f_{1.31\mu m}$). The beam waist position Δf'stated herein refers to "$f_n'(\beta) - f_{1.31\mu m}'(\beta)$," where $f_n'(\beta)$ represents a distance from the collimating lens 30 to the beam waist position after collimation at the wavelength $\lambda_n$ when the installation position of the collimating lens is set to "$f_{1.31\mu m}$+β"

Specifically, in FIG. 10, graph G1010 indicates a relation at the installation position of the collimating lens 30 with β=0 μm at $f_{131\mu m}$; graph G1020A indicates a relation at the installation position of the collimating lens 30 with β=+20 μm; graph G1030A indicates a relation at the installation position of the collimating lens 30 with β=+70 μm; graph G1040A indicates a relation at the installation position of the collimating lens 30 with β=+125 μm; graph G1050A indicates a relation at the installation position of the collimating lens 30 with β=+220 μm; graph G1060A indicates a relation at the installation position of the collimating lens 30 with β=+470 μm; graph G1070A indicates a relation at the installation position of the collimating lens 30 with β=+2970 μm; graph G1020B indicates a relation at the installation position of the collimating lens 30 with β=−30 μm; graph G1030B indicates a relation at the installation position of the collimating lens 30 with β=−130 μm; graph G1040B indicates a relation at the installation position of the collimating lens 30 with β=−230 μm; graph G1050B indicates a relation at the installation position of the collimating lens 30 with β=530 μm; graph G1060B indicates a relation at the installation position of the collimating lens 30 with β=−3030 μm. Furthermore, graph G1080A indicates a relation at the installation position of the collimating lens 30 with β=+100 μm.

As seen from this FIG. 10, when the adjustment position p of the collimating lens 30 is in the range of −30 μm to +70 μm, Δf' decreases with increase of wavelength, showing the steadily-decreasing tendency. On the other hand, when the adjustment position β is in the range from +125 μm to +2970 μm, Δf' demonstrates approximately steadily-increasing tendency, and thus this range is considered to be effective in terms of the chromatic aberration suppression. The range of the adjustment position β from −3030 μm to −130 μm also demonstrates the steadily-increasing tendency and thus seems effective to the chromatic aberration suppression. However, all the radii of curvature at the respective wavelengths at the position of the condensing lens 40 become negative, which is different from the condition of radii of curvature necessary for the suppression of chromatic aberration (shorter wavelength: negative and longer wavelength: positive, cf. FIGS. 5A to 5C). Therefore, it is expected that it is difficult to suppress the chromatic aberration in the range of the adjustment position β from −3030 μm to −130 μm. In the simulation of FIG. 10 the calculation over the wide range was conducted in order to grasp a full-length picture of Δf' against wavelengths. However, for example, in the case of the optical system with the adjustment position β of +2970 μm, the condensing optical system is composed of only the collimating lens 30 and the condensing lens 40 becomes extremely insignificant. Therefore, a practical optical system should be configured approximately up to $f_{1.31\mu m}+1000$ μm. On the other hand, the lower limit of the adjustment position p is between +70 μm and +125 μm. Then, when attention is focused on graph G1080A (β=+100 μm) in FIG. 10, we can recognize the steadily-increasing tendency in the shorter-wavelength region below the reference wavelength (e.g., the center wavelength) 1.31 μm and the lower limit of the adjustment position p can be presumed to be near +100 μm. Therefore, it is understood that a specific installation position suitable for the collimating lens 30 is from +100 μm to +1000 μm from the position $f_{1.31\mu m}$ apart from the entrance position of the laser light and is preferably a position from around +125 μm to +1000 μm.

Figure 11:
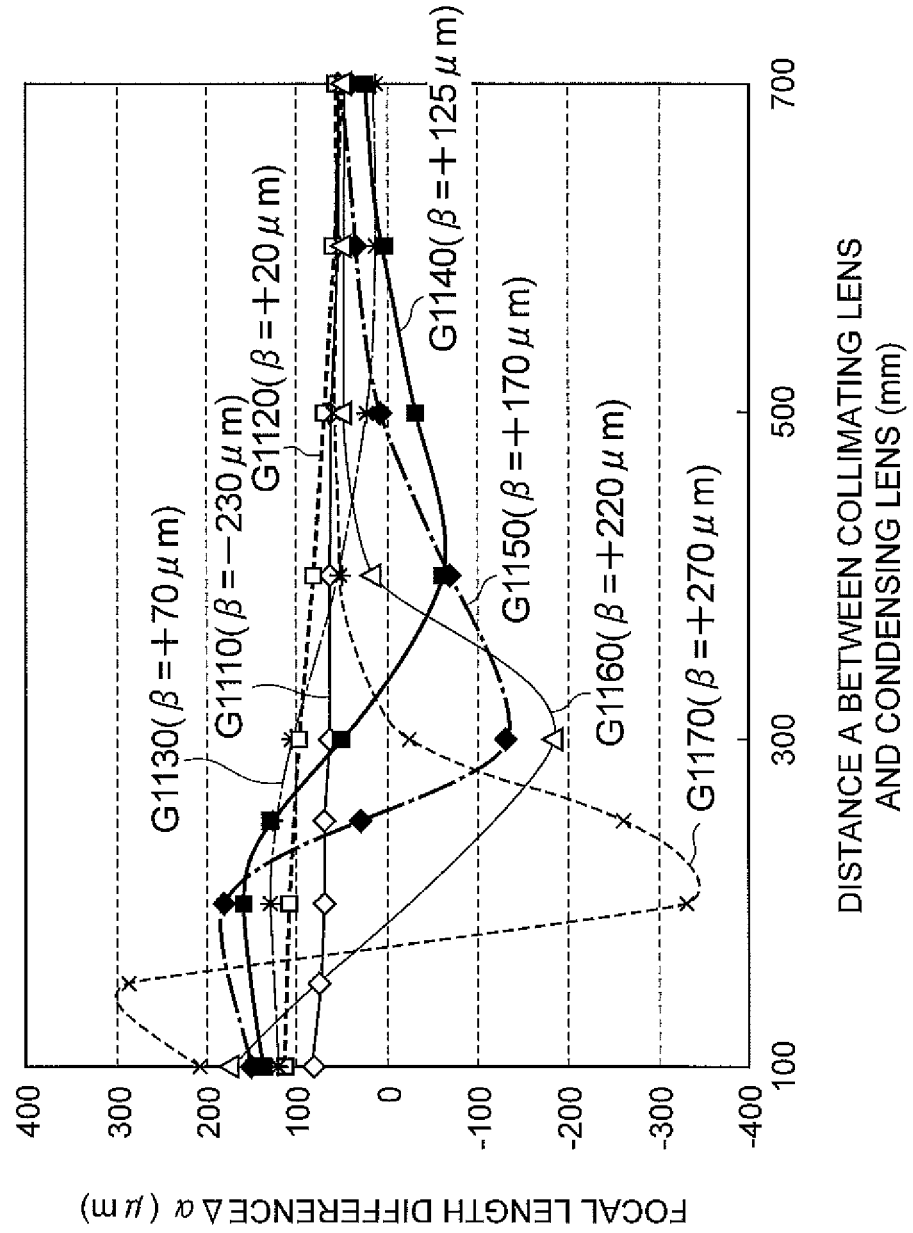
FIG. 11 is a drawing showing the calculation results of wavelength-dependent focal length difference Δα of multicolor light (of the wavelengths of 1.0 to 1.55 µm) versus distance A between the collimating lens and the condensing lens, with change in adjustment position β of the collimating lens.

FIG. 11 is a drawing showing the calculation results of wavelength-dependent focal length difference Δα of multi-color light (of the wavelengths of 1.0 to 1.55 μm) against distance A between the collimating lens 30 and the condensing lens 40, with change in the adjustment position p of the collimating lens 30. The adjustment position β represents a variation amount along the optical-axis direction of the collimating lens 30 with respect to the reference position $L_1$ (β=0 μm) at the focal position (focal position of the collimating lens 30) at the wavelength 1.31 μm from the exit end face 22 of the optical fiber 20.

In FIG. 11, graph G1110 indicates the wavelength-dependent focal length difference at the installation position of the collimating lens 30 with β=−230 μm; graph G1120 that at the installation position of the collimating lens 30 with β=+20 μm; graph G1130 that at the installation position of the collimating lens 30 with β=+70 μm; graph G1140 that at the installation position of the collimating lens 30 with β=+125 μm; graph G1150 that at the installation position of the collimating lens 30 with β=+170 μm; graph G1160 that at the installation position of the collimating lens 30 with β=+220 μm; graph G1170 that at the installation position of the collimating lens 30 with β=+270 μm.

In this FIG. 11, when the adjustment position β is −230 μm, +20 μm, and +70 μm, Δα is at least about 20 μm. On the other hand, when the adjustment position β is +125 μm, +170 μm, 220 μm, and 270 μm, Δα reaches nearly 0 (a level at which stage vibration in laser processing can be ignored) and among others the inclination of the graph is gentle with β=+125 μm, which is considered to be most suitable for the chromatic aberration suppression among the calculation conditions in the present embodiment. As also seen from the above result, it became clear that Δα was dependent on the characteristics of FIG. 10 and that "steady increase of Δf' with increase of wavelength" was appropriate for the chromatic aberration suppression. It also became clear as seen from FIG. 11 that the chromatic aberration could be positively increased.

Figure 12A:
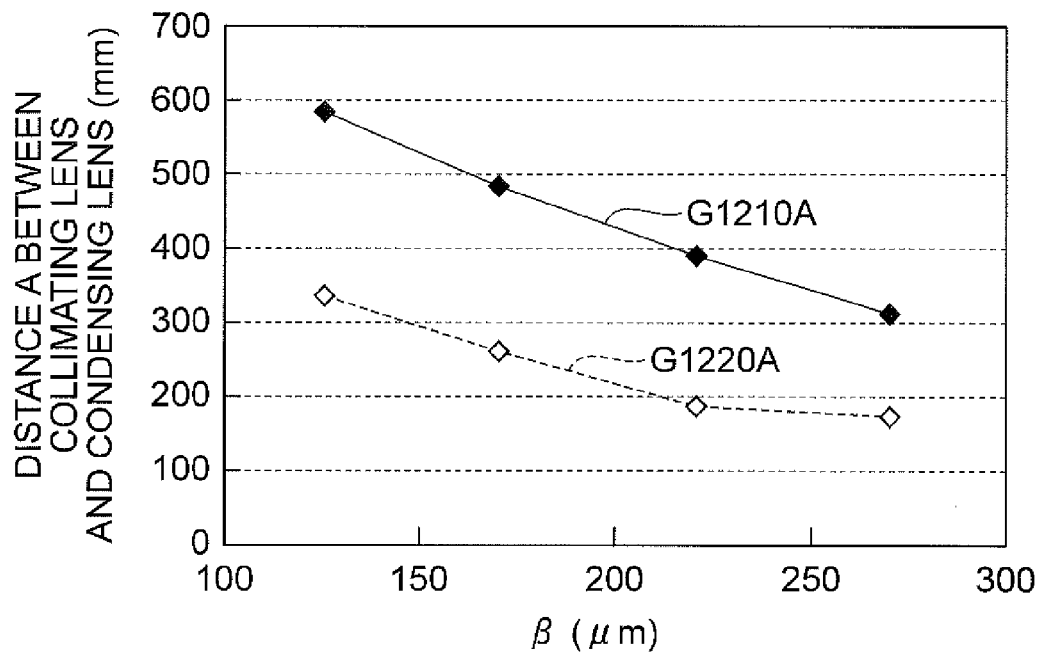
FIGS. 12A and 12B are drawings showing a relation of the distance A between the collimating lens and the condensing lens to the adjustment position β of the collimating lens, and its tolerance.
Figure 12B:
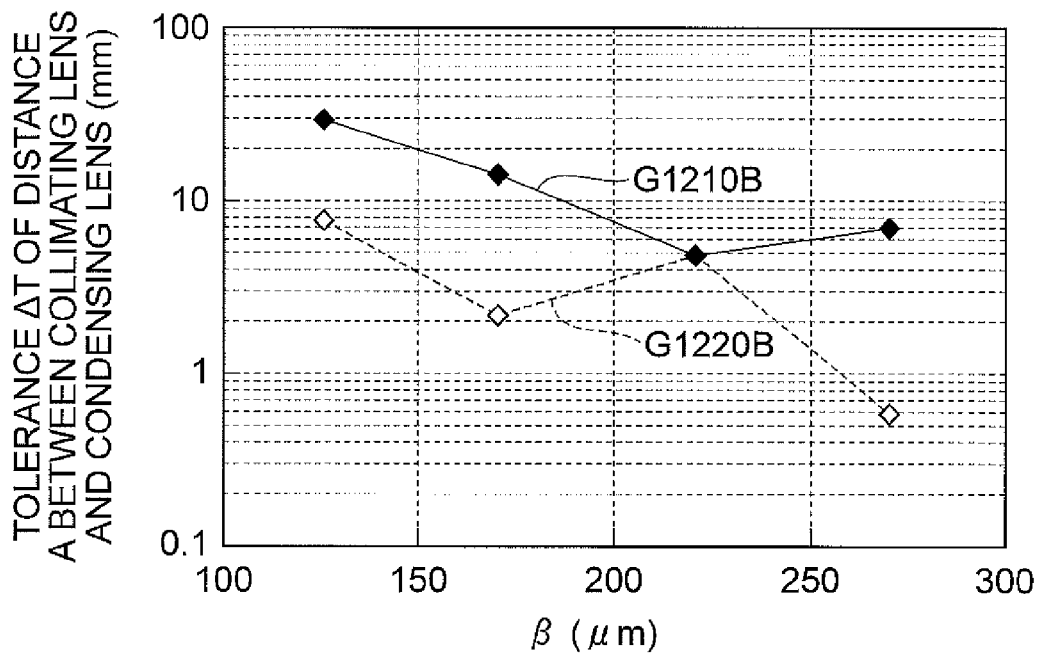

FIGS. 12A and 12B are drawings showing a relation of distance A between the collimating lens 30 and the condensing lens 40, against adjustment position β of the collimating lens 30, and its tolerance. Specifically, FIG. 12A is a drawing showing the relation of distance A between the collimating lens 30 and the condensing lens 40, against β (adjustment position of the collimating lens 30) with the installation tolerance ΔT of the condensing lens 40 being zero, i.e., with Δα being approximately 0.FIG. 12B is a drawing showing the tolerance of the distance A such that, with respect to the distance A in FIG. 12A, the installation tolerance ΔT of the condensing lens 40 becomes not more than ±5 μm (Δα<+5 μm). Both of the results in FIGS. 12A and 12B are obtained from the calculation results in FIG. 11.

As seen from FIG. 12A, there are two distances A (graphs G1210A and G1220A in FIG. 12A), for each β, in order to make Δβ approximately 0. Namely, for example, in the case of β=+270 μm, the distances A to make Δα approximately 0 are 170 mm and 310 mm. For downsizing the head box, it is preferable to set β to a larger value in either case and to set the condensing lens 40 at the distance A indicated by a dashed line (graph G1220A). However, as seen from FIG. 12B, the tolerance of the distance A to make Δα not more than +5 μm decreases with increase of β and there is a trade-off relationship between the downsizing and the tolerance of the distance A. For example, it is understood that when the tolerance of the distance A is approximately 10 mm, the value of β is about 200 μm and there are two distances A, ~400 mm (graph G1210B) and ~210 mm (G1220B). Since the condensing lens 40 can be installed well with the tolerance of the distance A even in several hundred micrometer order with use of a laser interferometer measuring instrument, the distance A can be made even not more than 200 mm. The head box can be downsized by setting two mirrors in the distance A to bend the optical path.

FIG. 13 is a drawing showing a configuration of an inspection optical system in the present embodiment. The inspection optical system for chromatic aberration suppression, shown in FIG. 13, has a structure corresponding to the laser light source 1 in FIG. 1B and a measuring system. Namely, the laser light source of the inspection optical system in FIG. 13 has a Super continuum light source 11 being the multicolor light source 10, a Nufem's LMA fiber 21 (corresponding to the optical fiber 20 as delivery fiber), an achromatic lens 31 corresponding to the collimating lens 30, and the condensing lens 40. Furthermore, this laser light source has a pedestal 70 holding the Nufern's LMA fiber 21 and achromatic lens 31, a pedestal 80 holding the condensing lens 40, and an XYZ stage 75 installed on the pedestal 70 and configured to adjust the installation position of the achromatic lens 31. The XYZ stage 75 incorporates a Z-directional micrometer 76. The Nufern's LMA fiber 21 is a Nufern's large mode area fiber (model number: PLMA-YDF-10/125-VIII) and has the core diameter of 11 μm and the numerical aperture NA of 0.075. The achromatic lens 31 corresponding to the collimating lens 30 is a communication-band achromatic doublet lens (model number: AC050-008-C, $f_{1.3\mu m}$=5.2407 mm) manufactured by Thorlab Inc. and in this optical system, the same achromatic lens (model number: AC050-008-C) is also adopted for the condensing lens 40. The Z-directional micrometer 76 adopted herein is a coarse-fine motion micrometer head (manufactured by SURUGA SEIKI Co., Ltd.: B83-1, minimum reading fine motion: 0.5 μm).

On the other hand, the measuring system is composed of a mid-infrared camera 60 and an objective lens 65. The mid-infrared camera 60 adopted herein is XenICs (InGaAs). The objective lens 65 is selectively used depending upon the distance A from the relation of the beam diameter. Namely, the objective lens 65 adopted for the distance A from 200 to 400 mm is NIKON M PlanApo 200/0.95, 210/0. The objective lens 65 adopted for the distance A from 500 to 700 mm is MITSUTOYO M Plan MR 100/0.50, ∞/O. Band-pass filters were used to extract predetermined wavelengths from the multicolor light source. The center wavelengths of the band-pass filters are 1.0 μm, 1.1 μm, 1.2 μm, 1.31 μm, and 1.55 μm, respectively, and their half bandwidths all are 10 nm.

In the optical system of FIG. 13, the laser light emitted from the Super continuum light source 11 travels through the Nufern's LMA fiber 21 and is emitted toward the achromatic lens 31. Since the distance between the Nufern's LMA fiber 21 and the achromatic lens 31 needs to be controlled in units of several μm, Z-directional adjustment of the achromatic lens 31 is carried out by the XYZ stage 75 equipped with the coarse-fine motion micrometer head 76 (minimum reading fine motion: 0.5 μm). The measurement of Δα is carried out by measuring the light condensed by the condensing lens 40 with the mid-infrared camera 60. Since measurement software of the mid-infrared camera 60 (XenICs) provided only beam profile images, Δα was determined from a camera position where a minimum beam profile was obtained at each wavelength.

Figure 14:
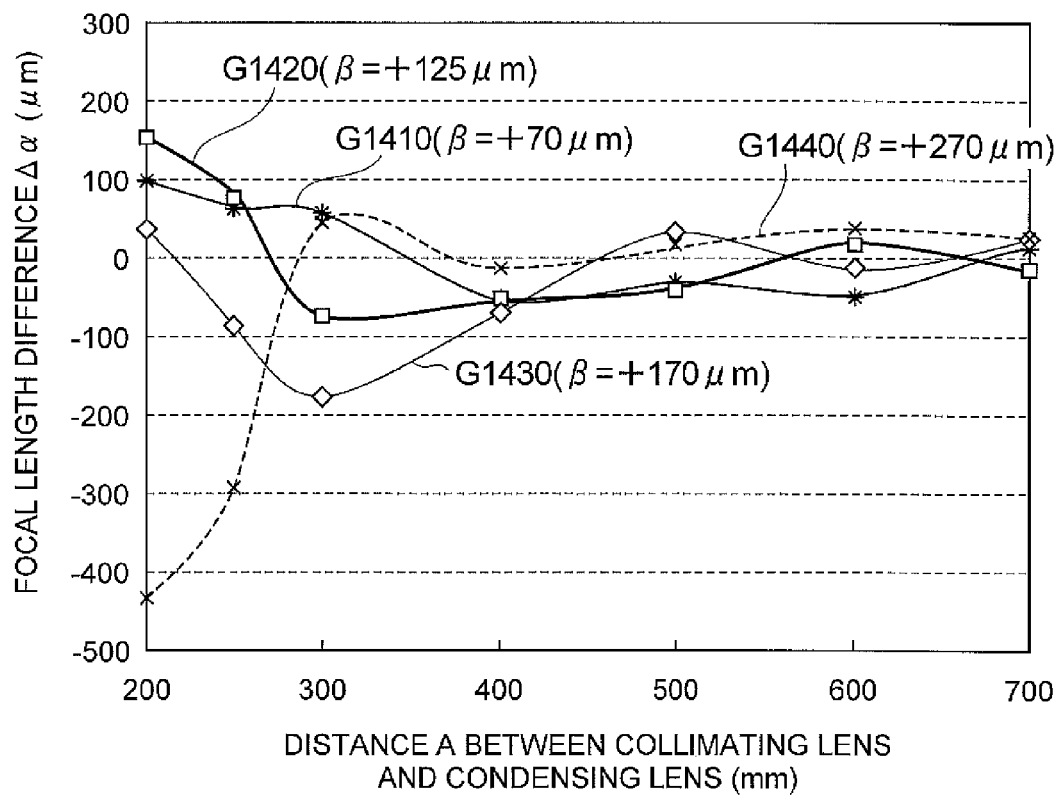
FIG. 14 is a drawing showing the measurement results of beam waist position against wavelength from 1.0 µm to 1.55 µm, with change in adjustment position β of the collimating lens.

FIG. 14 shows the measurement results of beam waist positions for the wavelengths from 1.0 μm to 1.55 μm, with change in the adjustment position p of the achromatic lens 31, by the optical system in FIG. 13. FIG. 11 is the corresponding calculation results. This measurement was started from the distance A (=200 mm) where there is no interference between the XYZ stage 75 supporting the achromatic lens 31 and a stage supporting the mid-infrared camera 60.

In FIG. 14, graph G1410 indicates the wavelength-dependent focal length difference Act at the installation position of the achromatic lens 31 with β=+70 μm; graph G1420 that at the installation position of the achromatic lens 31 with β=+125 μm; graph G1430 that at the installation position of the achromatic lens 31 with β=+170 μm; graph G1440 that at the installation position of the achromatic lens 31 with =+270 μm.

The measurement results in FIG. 14 show vibration on the whole, but all the measurement results are approximately equal to the calculations results while the overall aspects are quite similar in tendency to FIG. 11, confirming the validity of the calculation results.

As described above, the present embodiment enables the chromatic aberration to be suppressed when the multicolor light with the wide spectral width is collimated and then condensed. The present embodiment controls the distance between the exit end face of the delivery fiber and the collimating lens in units of several ten μm and arranges the condensing lens at the desired position, whereby the chromatic aberration can be made theoretically zero. For inspecting the validity of the calculations results, the optical system (FIG. 13) used for the simulation was prepared and the inspection experiments were carried out, obtaining the result that good agreement was made with the calculation results, so as to verify the effectiveness of the chromatic aberration suppression of the present embodiment. The above clarified that the chromatic aberration was compressed more by application of the chromatic aberration suppression of the present embodiment than by the achromatic lens with incidence of plane waves and could be made theoretically zero. Furthermore, the present embodiment can also positively increase the chromatic aberration, as also seen from FIG. 11.

REFERENCE SIGNS LIST

1 laser light source; 10 light source; 20 optical fiber; 25 laser light entrance portion; 26 pinhole mask; 30 collimating lens; 35 collimating lens installation portion; 40 condensing lens; 45 condensing lens installation portion; 50 position adjustment portion.

The invention claimed is:

1. A laser light source comprising:
 a single-mode optical fiber which emits laser light with a spectral width of several hundred nm from a core portion thereof;
 a collimating lens which collimates the laser light divergently emitted from the single-mode optical fiber;
 a condensing lens which condenses the laser light collimated by the collimating lens;
 a laser light entrance portion which sets an entrance position of the laser light emitted from the single-mode optical fiber; and
 a collimating lens installation portion which fixes the collimating lens,
 wherein an installation position of the collimating lens with respect to the laser light entrance portion is set so that a beam waist position of the laser light having passed through the collimating lens shifts closer to the collimating lens with a shorter-wavelength-side wavelength component out of wavelength components included in the laser light.

2. The laser light source according to claim 1, wherein the laser light includes a wavelength component the beam waist position of which is located on the single-mode optical fiber side with respect to the collimating lens.

3. The laser light source according to claim 1, wherein the collimating lens has a light entrance face for the laser light emitted from the single-mode optical fiber to enter and a light exit face for the laser light to exit, and
 wherein when, with respect to a position of the light exit face of the collimating lens arranged so that a focal point of the collimating lens is located on the light exit end face of the single-mode optical fiber at a center wavelength of the laser light, a negative region is defined on the single-mode optical fiber side and a positive region on the condensing lens side,
 the collimating lens is installed in the range of +100 μm to +1000 μm along the optical axis of the laser light emitted from the single-mode optical fiber.

4. The laser light source according to claim 1, comprising: a condensing lens installation portion which fixes the condensing lens, wherein an installation position of the condensing lens with respect to the collimating lens is set so as to fall within a region where chromatic aberration of the laser light condensed through the condensing lens becomes minimum.

5. The laser light source according to claim 1, wherein the collimating lens is a lens that reduces chromatic aberration.

6. The laser light source according to claim 1, wherein the condensing lens is a lens that reduces chromatic aberration.

7. The laser light source according to claim 1, comprising: a position adjustment portion provided for either one of the laser light entrance portion and the collimating lens installation portion, the position adjustment portion enabling position adjustment of a distance between the entrance position of the laser light and a center position of the collimating lens in a 10-μm or smaller level.

\* \* \* \* \*